United States Patent [19]

Scheibner

[11] Patent Number: 4,859,259
[45] Date of Patent: Aug. 22, 1989

[54] PROCESS AND APPARATUS FOR RECLOSABLE CONTAINER STOCK

[75] Inventor: Gerald H. Scheibner, Downers Grove, Ill.

[73] Assignee: First Brands Corporation, Danbury, Conn.

[21] Appl. No.: 535,350

[22] Filed: Sep. 23, 1983

Related U.S. Application Data

[63] Continuation-in-part of Ser. No. 361,191, Mar. 24, 1982, abandoned.

[51] Int. Cl.$^4$ .............................................. B29C 47/92
[52] U.S. Cl. ................................. 156/66; 156/244.15; 156/244.27; 156/495; 156/501; 264/40.5; 264/40.7; 264/146; 264/171; 264/177.1; 264/177.19; 425/114; 425/367
[58] Field of Search ................... 264/146, 214, 177 R, 264/171, 103, 174, 216, 40.1, 40.5, 40.7, 177.1, 177.19; 425/131.1, 133.5, 194, 394, 367, 114; 156/498, 243, 244.15, 244.27, 66, 501, 358, 495, 378; 24/201 C

[56] References Cited

U.S. PATENT DOCUMENTS

| 1,128,621 | 2/1915 | Nazel | 425/367 |
| 2,821,746 | 2/1958 | Bicher, Jr. | 264/214 |
| 3,134,138 | 5/1964 | Pufahl | 264/214 |
| 3,382,133 | 5/1968 | Healy | 425/367 |
| 3,532,571 | 10/1970 | Ausnit | 264/209.1 |
| 3,647,342 | 3/1972 | Hunt | 425/394 |
| 4,259,133 | 3/1981 | Yagi | 425/114 |

Primary Examiner—Jeffery Thurlow
Attorney, Agent, or Firm—Gary L. Wamer

[57] ABSTRACT

A process and apparatus for producing a reclosable container stock with adhered occludable closure strip portions, said apparatus comprising a rotatable lay-on roll having circumferential grooves therein, means to advance the closure strip portions to the lay-on roll, a rotatable casting cylinder positioned opposite the lay-on roll, means for extruding a molten plastic film onto the casting cylinder so that the film adheres to the closure strip portions, and means for cooling the resulting reclosable container stock with adhered closure strip portions.

29 Claims, 4 Drawing Sheets

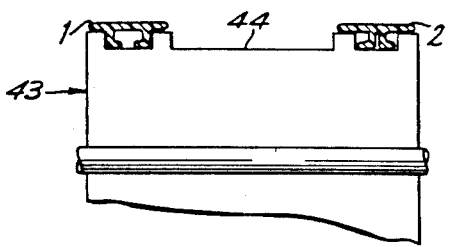
FIG. IB
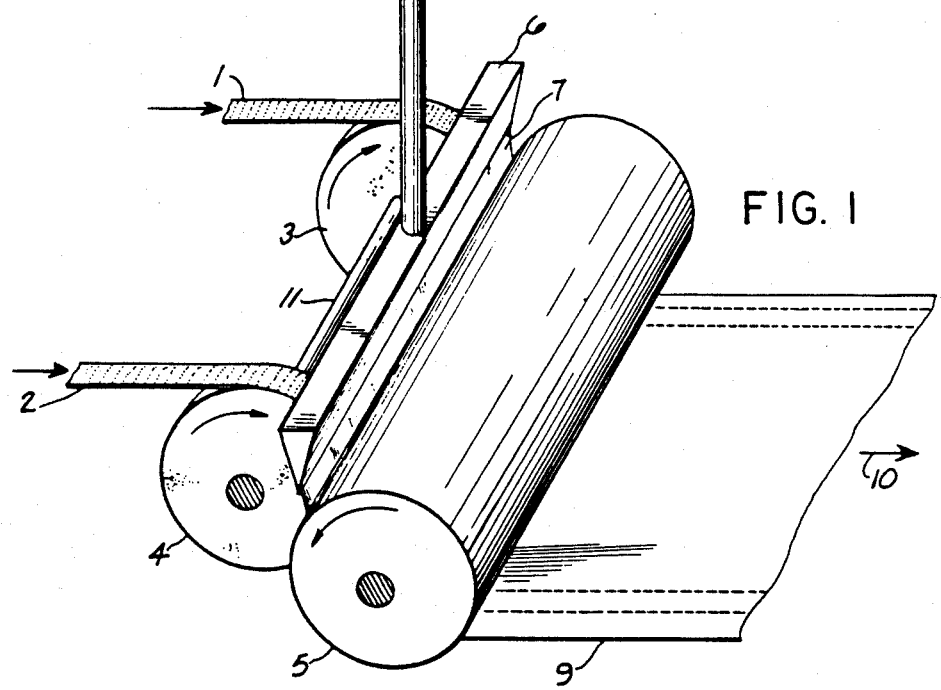
FIG. I
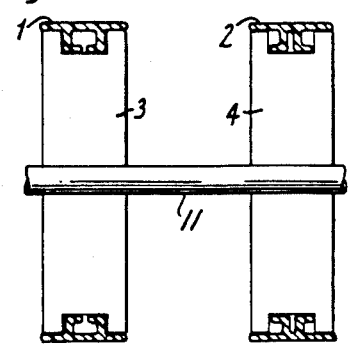
FIG. IA

PROCESS AND APPARATUS FOR RECLOSABLE CONTAINER STOCK

This application is a continuation-in-part application of Ser. No. 361,191 filed Mar. 24, 1982, now abandoned.

This invention relates to a plastic container having a reclosable fastener, and more particularly, to a process and apparatus for providing an article useful in producing interlocking closure bag products.

Plastic containers which feature reclosable fasteners are generally well known and widely used by consumers and in industry. Their popular use has provided a strong incentive for the development of improved manufacturing equipment and methods for more economical operations as well as products having more appeal in the marketplace.

One particularly desirable type of reclosable fastener is disclosed in U.S. Pat. No. 4,212,337 to Kamp wherein the closure fastening device comprises a first channel element having hook portions facing away from each other, and a second channel element having hook portions facing towards each other. The channel elements interlock by pressing the first channel element into the second channel element so that the hook portions engage each other. This closure fastening device is attached at the opening of a container to form a container capable of being closed and opened.

Generally, the plastic container stock is made from a film of polyethylene, polypropylene, nylon or other thermoplastic material which is manufactured by extrusion. Each closure element of the fastening device can be manufactured as a strip for subsequent attachment to the film by the use of appropriate means. For example, a thermoelectric device can be used to apply heat to a film in contact with a closure strip to cause a transfer of heat through the film to produce fusing at the interface of the film and the closure strip. The fusing of the film and the closure strip may also be established by the use of hot melt adhesives, hot air sealing, or other methods such as ultrasonic heating. However, hot air sealing of closure strips to a film requires a sizable inside closure flange to seal to the film. This extra material in the closure strips contributes little to functionality of the container and increases its cost. In addition, current hot air sealing technology for this purposes entails limited production capacity. The resulting hot air seals do not cover the entire flange of each closure strip thereby making the flanges noticeably visible and giving the reclosable container an added-on appearance.

To avoid the aforementioned detractions, it has been proposed to adhere the closure fastening device integral with the film as disclosed in U.S. Pat. No. 4,306,924. It is taught therein that the production of a plastic film connected to a pair of occludable closure strips may be provided by feeding a supply of closure strips to a casting cylinder and extruding a molten plastic film onto the casting cylinder so that the plastic film, before cooling, becomes fused to the flange portions of the closure strips. The casting cylinder is provided with a pair of spaced-apart circumferential grooves so that the respective profile portions of the closure strips extend therein. During casting of the molten plastic film, urging means are employed for pressing the plastic film against the flange portions of the closure strips. However, it has been found that such pressure is difficult to control and may cause damage to the profile portions of the closure strips during lamination with the molten plastic film. In addition, the molten slot cast film is susceptible to being thinned out in the area directly adjacent to the lamination thereby giving rise to weak areas.

Thus, there is a continuing need for a method and apparatus useful for producing a plastic film connected to occludable closure strips, and reclosable container products which overcome the above-noted problems.

Accordingly, in one embodiment of this invention there is provided an apparatus for producing plastic film with occludable closure strips fused thereto wherein the closure strips have profile portions and flange portions, which apparatus comprises feeding means for supplying the closure strips; a rotatable, circumferentially grooved lay-on roll; a rotatable casting cylinder positioned opposite the lay-on roll wherein the axis of the casting cylinder is parallel to the axis of the lay-on roll; advancing means to advance the closure strips to the lay-on roll so that unoccluded profile portions of the closure strips extend into the grooves of the lay-on roll; extruding means for casting a molten plastic film onto the casting cylinder so that the molten plastic film becomes fused to the flange portions of the closure strips; and additional cooling means for the laminated combination of the plastic film and closure strips.

The lay-on roll has circumferential grooves defined therein and provides means to space and transfer the closure strips, which may be of indeterminate length, toward the casting cylinder. The extruding means is preferably a slot die having an elongated opening parallel with and spaced from the periphery of the casting cylinder, said die being suitable to cast a film of molten thermoplastic material on the periphery of the casting cylinder. Means are provided for rotating the casting cylinder at substantially the same surface speed as the speed at which fed closure strips are advanced whereby the closure strips are laminated to the film of molten thermoplastic material cast on the casting cylinder. The combination of closure strips and plastic film is then advanced to further cooling means such as a chill roll.

In another embodiment of this invention there is provided a method for producing a plastic film fused to occludable closure strips, each strip having profile and flange portions, comprising the steps of supplying the closure strips, advancing the closure strips to a rotatable grooved lay-on roll so that unoccluded profile portions of the closure strips extend into the grooves of the lay-on roll, extruding a molten plastic film onto a rotatable casting cylinder positioned opposite the lay-on roll so that the plastic film becomes fused to the flange portions of the closure strips, and thereafter cooling the combination of plastic film and closure strips.

Broadly speaking, the operation of this invention involves adhering an interlocking closure strip, which is in a non-molten state, to a molten film of thermoplastic material. The process is continuous and employs a slot film casting station and a grooved lay-on roll. An interlocking closure strip generally will comprise at least two profile portions and corresponding flange portions. The one or more interlocking closure strips are fed to a lay-on roll having grooves therein to accommodate the contours of the closure strip profiles. After lamination of the flange portions of the closure strip(s) to the molten slot cast plastic film, a chill roll serves to further cool the laminate of film and closure strip(s). The apparatus may also be equipped with slitters to remove trim such as edge beads and to slit the laminate to provide multiple products with closures.

More specifically, in a preferred embodiment the interlocking closure strips are fed into the grooving of a plurality of rubber-covered lay-on rolls which align the strips into the proper lateral positions prior to contact and lamination with the molten thermoplastic film. The lay-on rolls are each only as wide as the specific portion of the closure strip to be laminated with the molten thermoplastic film and normally do not contact the molten thermoplastic film. The lamination pressure exerted by the lay-on rolls on the casting cylinder, with the closure strips and molten plastic film therebetween, is controlled by spacing means such as air cylinders or jacking bolts to prevent damage to the profile portions of the closure strips. Obviously, any number of such lay-on roll arrangements may be employed on a common shaft, or the lay-on rolls may be mounted on separate shafts.

For a fuller understanding of the nature and objects of the invention, reference should be made to the following detailed description taken in conjunction with the accompanying drawings, in which:

FIG. 1 is a diagrammatic perspective view of one embodiment of the invention;

FIG. 1A is a schematic sectional view of a lay-on roll embodiment of the invention.

FIG. 1B is a schematic sectional view of yet another lay-on roll embodiment of the invention.

Figure 2:
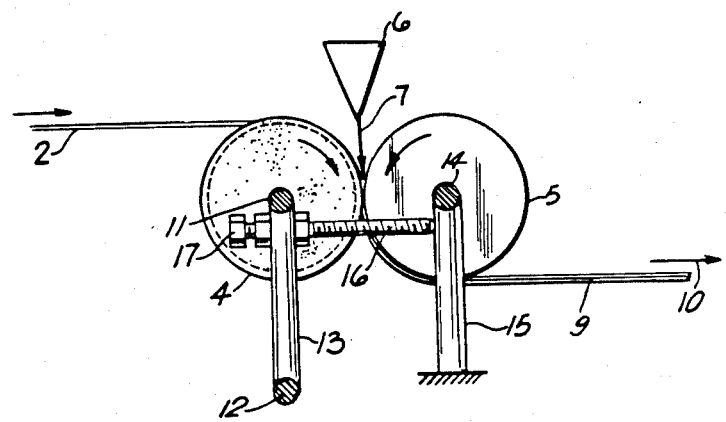
FIG. 2 is a side view of lay-on roll and casting cylinder parts showing means for spacing adjustment therebetween.

In carrying out the invention, several embodiments have been selected for illustration in the accompanying drawings and for specific description, reference being had to the figures herein.

In FIG. 1, a deoccluded closure strip comprised of portions 1 and 2 are supplied from a supply source (not shown) such as an unwind reel. The supply source for the closure strip portions may be a roll of prefabricated closure strips or an in-line operation that supplies the closure strip portions. The closure strip portions are fed to spaced-apart circumferentially grooved, individual lay-on rolls 3 and 4 mounted on a common shaft 11 and adapted to rotate. The lay-on rolls are positioned opposite a rotatable casting cylinder 5 wherein the axis of casting cylinder 5 is parallel to the axis of lay-on rolls 3 and 4. A slot die 6 having an elongated opening parallel to the axis of the casting cylinder and the lay-on rolls is positioned adjacent to and spaced from the peripheries of the casting cylinder and the lay-on rolls for casting a film 7 of molten thermoplastic material on the periphery of the casting cylinder. Slot die 6 is supplied by melt feed conduit 8. The film 7 of molten thermoplastic material is extruded from slot die 6 onto casting cylinder 5 and contacts closure strip portions 1 and 2 to become fused thereto and form laminated composite 9 which after further cooling (means not shown) may be forwarded to slitting and/or winding means generally indicated as arrow 10.

FIG. 1A illustrates another embodiment of this invention wherein lay-on roll 3 is mounted onto common shaft 11 along with lay-on roll 4, and lay-on rolls 3 and 4 are axially movably mounted on shaft 11. This embodiment enables various spacing distances between the lay-on rolls and also allows fusing of the closure strip portions 1 and 2 at any desired lateral locations on film 7.

FIG. 1B depicts a further embodiment of the invention wherein a single lay-on roll 43 is employed. In this embodiment, the single lay-on roll has two grooves to accommodate closure strip portions 1 and 2. The grooves herein may be positioned at or near the ends of single lay-on roll 43 and the lay-on roll may have a recess 44 between the grooves to prevent contact of molten film 7 with lay-on roll 43. When a single lay-on roll is employed, the lay-on roll may have any desired number of grooves and recesses in any desired location.

In FIG. 2, the elements depicted therein bear the same designation numbers as in FIG. 1. In FIG. 2, it is shown that lay-on roll 4, as well as lay-on roll 3 (not shown herein), are supported by a suitable shaft 11 mounted on a support 13 having pivot means 12 located at the other end to pivot the lay-on rolls. Likewise, casting cylinder 5 is supported by a shaft 14 mounted on support 15. Mounted on support 13 is adjustable jacking bolt 16 which contacts support 15 for casting cylinder 5. Jacking bolt 16 is threaded and may be turned by hexagonal head 17 to adjust the spacing and lamination pressure between lay-on rolls 3 (not shown in FIG. 2) and 4 and casting cylinder 5. The adjustment of such pressure serves to avoid damage, by crushing, of the profile portions of closure strip portions 1 and 2 during lamination with film 7 of molten thermoplastic material. Located at the opposite end of shaft 11 is another support with pivot means (not shown) similar to support 13 that is likewise equipped with a jacking bolt, similar to jacking bolt 16, and another support similar to support 15 on the opposite end of shaft 14. These elements also provide spacing adjustment of lay-on rolls 3 and 4 and avoid damaging the profile portion of closure strip portion 1 and closure strip portion 2.

Figure 3:
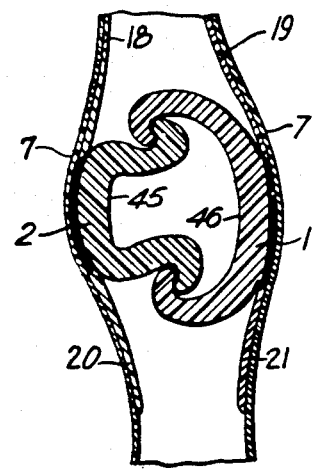
FIG. 3 illustrates an occluded closure strip laminated to a thermoplastic film.

FIG. 3 shows closure strip portions 2 and 1 having male profile element 45 and female profile element 46 in occluded position. Also shown therein are outside flange portions 18 and 19, and inside flange portions 20 and 21 of closure strip portions 2 and 1 which are laminated to film 7. Inside flange portions 20 and 21 may be substantially shorter than outside flange portions 18 and 19.

Figure 4:
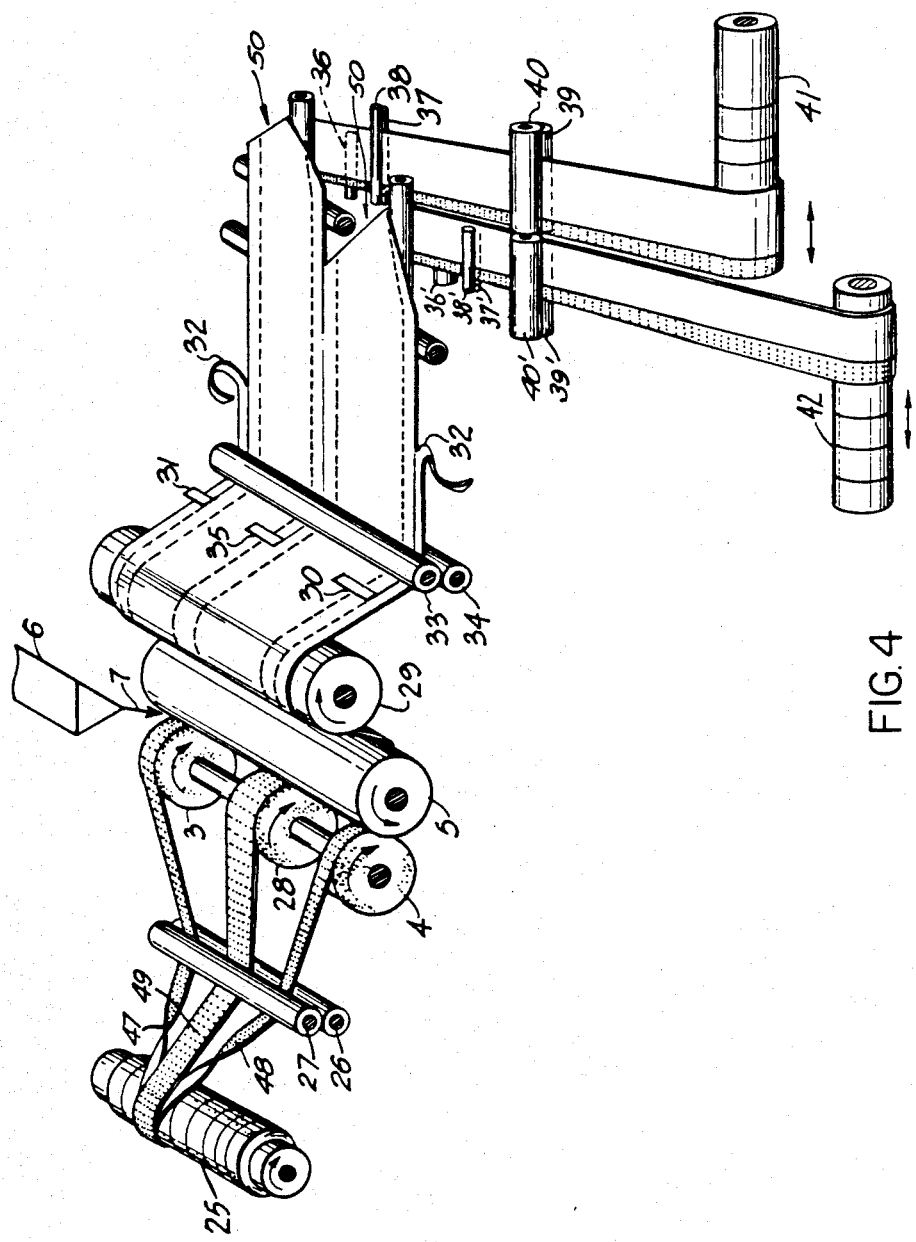
FIG. 4 is a diagrammatic perspective view of a preferred embodiment of the invention.

The best mode for carrying out the practice of this invention is shown in FIG. 4. An unwind stand (not shown) feeds a double set of interlocking closure strips from reel 25. The unwind stand provides a limited amount of back tension on the strips while they are being deoccluded and drawn towards the casting station by nip rolls 26 and 27. The nip rolls control the tension of deoccluded closure strip portions 47, 48 and 49 which pass to grooved rubber-covered lay-on rolls 3, 4 and 28 respectively. In this embodiment, prior to passage of closure strip portions 47 and 48 through nip rolls 26 and 27, the closure strip portions are twisted 180° so that the profiles thereof face away from casting cylinder 5. Lay-on rolls 3 and 4 are fed closure strip portions 47 and 48 which comprise male elements and lay-on roll 28 is fed closure strip portion 49 which comprises the two unified female elements. Slot cast die 6 forms film 7 which is cast onto casting cylinder 5. Preferably, the lay-on rolls are driven by contact with the closure strip portions which are drawn by the driven casting cylinder 5, chill roll 29, and nip rolls 33 and 34. Optionally, the lay-on rolls may be power-driven.

Proper lamination of the closure strip portions to the molten thermoplastic film is dependent on control of the lamination pressure exerted by the lay-on rolls on the closure strip portions, which in turn are in contact with the molten film at the surface of the casting roll. Control of the lamination pressure may be achieved by the use of jacking bolts or air cylinders. The use of air cylinders is preferred because of the self-compensating characteristics in the control of lamination pressure, in the event the lay-on rolls and/or casting roll are slightly out of round. Each of the air cylinder units is generally comprised of a pneumatic piston or cylinder actuator having a rod clevis for attachment to an element transferring thereto the pressure exerted by the air cylinder. The amount of pressure exerted may generally be controlled by a pressure regulator.

In a preferred embodiment herein, the aforementioned lamination pressure is provided by air cylinder units yielding a laminating force of between about 50 pounds and about 500 pounds applied to the roughly 3 inches of width of the lay-on rolls, or between about 17 pounds and about 170 pounds per lineal inch of lay-on roll width. In operation, preferably a force of about 200 pounds applied per approximately 3 inches of width of the lay-on rolls is used to laminate the closure strip portions and the cast thermoplastic film.

Air knives (not shown) may be positioned between the lay-on rolls to push the molten thermoplastic film closer to the casting cylinder for more efficient heat transfer with the casting cylinder. Additional air nozzles (not shown) may be provided to help cool the thicker edge beads. The laminated composite, closure profiles face down, passes over a chill roll 29 for further cooling.

After passing over chill roll 29, the laminated composite is edge trimmed by knives 30 and 31 which cut the excess cast film, i.e., edge beads 32, away from the laminated composite. The slit web is maintained at uniform tension by passing through nip rolls 33 and 34. Trimming just prior to nip rolls 33 and 34 is preferred because of the relatively high tension on the film that allows consistent trimming. Center slitter 35 cuts and separates the laminated composite between the two female profile elements. The separated laminated composites may pass over bowed rolls (not shown) to pull soft wrinkles out prior to passing over folding stations 50 having grooves therein to accommodate the profile elements of the laminated composites. The trimmed edges 32 are diverted to scrap winders (not shown) thereby bypassing the folding stations. After folding, the profile elements of the laminated composites are captured by air bearing guide surfaces 36 and 36' which align the closure profile elements prior to occlusion thereof by paired rolls 37, 38, and 37', 38'. Nip rolls 39, 40, and 39', 40', having grooves in the areas of the occluded closure portions, maintain constant web tension during the critical folding and occluding steps. The two continuous webs of reclosable container stock produced are each wound on separate reels 41 and 42, mounted on separate winders.

Figure 5:
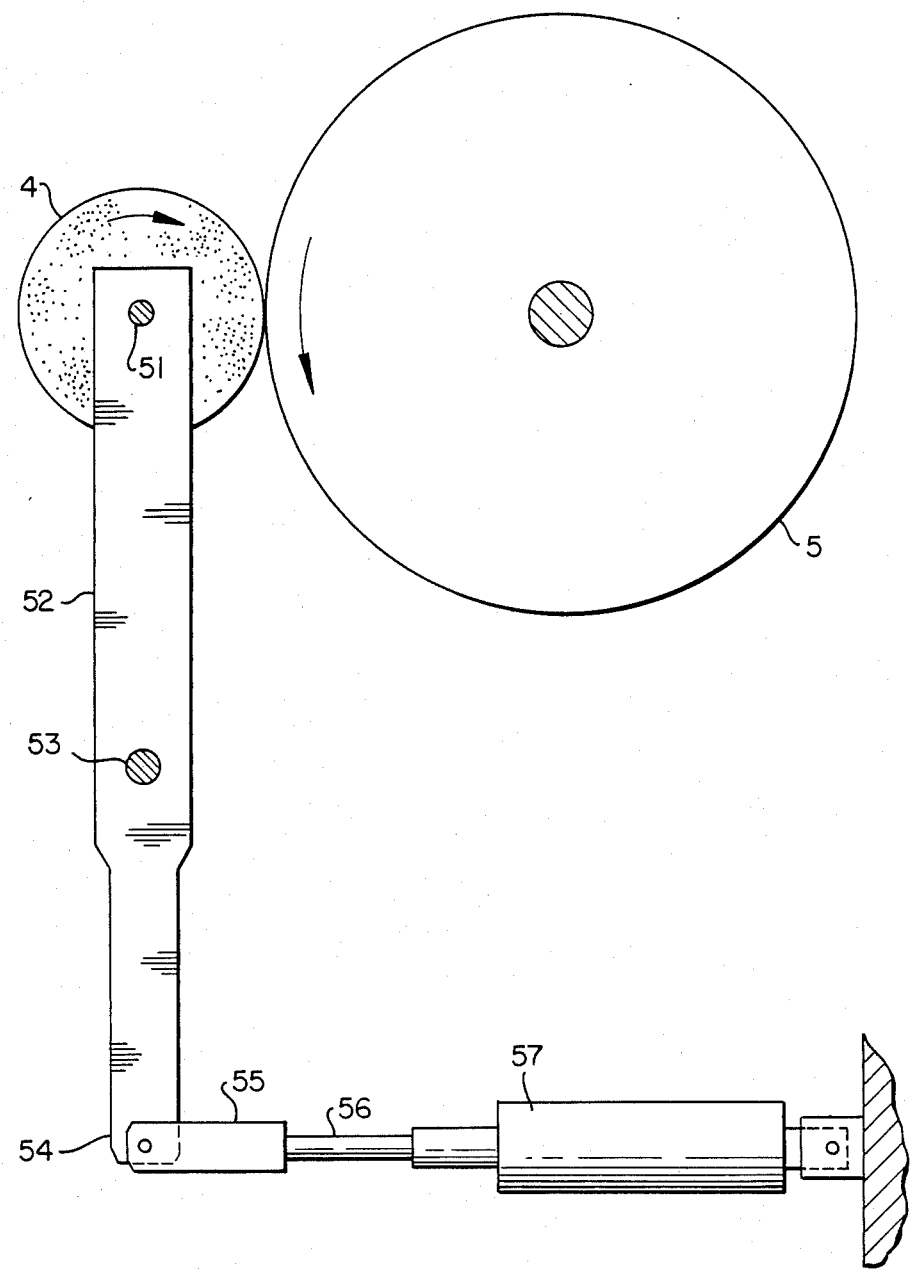
FIG. 5 is a side view of a lay-on roll and casting cylinder showing means for controlling the lamination pressure between a closure strip(s) and a thermoplastic film.

FIG. 5 is a side view of a lay-on roll 4 supported by a suitable shaft 51 mounted on a support 52 having pivot means 53. The distal portion 54 of support 52 is shown connected to a rod clevis 55 extending from a pneumatic piston or cylinder actuator 56 emanating from air cylinder unit 57. The amount of pressure emanating from air cylinder unit 57 may be controlled by a pressure regulator in the air line (not shown). In operation, air cylinder unit 57 drives cylinder actuator 56 and rod clevis 55 against the distal portion 54 of support 52 having pivot means 53, whereby support 52 pivots towards casting cylinder 5, thereby causing lamination pressure between the closure strip portion (not shown) carried by lay-on roll 4 and the thermoplastic film cast on the surface of casting cylinder 5.

Various alternatives may also be practiced pursuant to this invention. Thus, a closure strip portion may be produced and not occluded with a mating closure strip portion. These unoccluded strip portions may be substituted into the aforementioned step calling for an occluded closure strip unwinding from a reel supply. Further, each closure strip portion may be extruded directly into the lamination area with appropriate cooling means therefor. In addition, the laminate face of the closure strip flanges and/or of the thermoplastic film may be coated or coextruded with a different polymer to enhance lamination. The laminating face of the closure strip flanges may be preheated to enhance lamination with the film. Multiple lamination arrangements may be employed. The casting cylinder may have a matte or textured surface to provide desired container body and flange surface characteristics. The slot die may be contoured to provide additional film thickness in the lamination area. Such contouring may enhance container quality, especially for container cold temperature use reliability and also improve perceived quality by stiffening the top of the container. Where desired, each closure profile, each closure flange, and the thermoplastic film may each be produced from totally different polymers thus providing unique container constructions such as a pliable closure on a strong, stiff container body, or different colors may be imparted to the container body and the various parts of the closure strip. Another variation contemplates that rather than winding up the container stock on a reel, the container stock may be fed directly into a container forming/sever-sealing mechanism such as a bag machine.

It is to be noted that certain advantages over the prior art accrue from the practice of this invention. One of these advantages is that the tension on the closure strip portions, as they are fed from the supply source to the lamination area, is controlled for more uniform lamination with the thermoplastic film. Another advantage is that as the closure strip portions are fed to grooved lay-on rolls which position and align the strip portions, and since these rolls are only as wide as the closure strip part being laminated, the lay-on rolls never contact the film of molten thermoplastic material and therefore do not distort the thermoplastic film. As shown earlier, the lay-on rolls are prevented from contacting the molten thermoplastic film by the jacking bolts placed between the lay-on roll(s) and the casting cylinder. Further, in the practice of this invention, only a short inside flange on each of the closure strip portions is required since attachment of the film to the closure strip is via lamination across most of the back of the closure strip flange. In addition, attachment of thermoplastic film to closure strips is not limited to speeds of about 100 feet per minute, but substantially higher speeds may be achieved with excellent lamination quality. Also, since the lamination area covers most of the back of the closure strip portions, the laminations are much less noticeable and the possibility of the two closure strip portions welding together in the area of film attachment as may occur during hot-air sealing of film to an occluded closure strip, is eliminated. Finally, since there are fewer critical control conditions compared with a hot-air sealing system, the present invention provides more consistent results.

Having described the invention, it is contemplated that modifications thereof may be made and that some features may be employed without others, all within the spirit and scope of the invention. However, it is not desired to be limited to the illustrative embodiments for obvious modifications will occur to a person skilled in the art.

| LISTING OF ALL FOREIGN APPLICATIONS FILED PRIOR TO FILING DATE OF THIS APPLICATION | | |
|---|---|---|
| COUNTRY | APPLICATION NUMBER | FILED |
| Australia | 83-12758 | 3-23-83 |
| Canada | 421371-8 | 2-11-83 |
| Denmark | 83-00822 | 2-23-83 |
| Finland | 83-00923 | 3-18-83 |
| Ireland | 83-00626 | 3-22-83 |
| Japan | 83-048623 | 3-23-83 |
| New Zealand | 203362 | 2-22-83 |
| Norway | 83-00880 | 3-14-83 |
| E.P.C. | 83102844.4 | 3-22-83 |

I claim:

1. An apparatus for producing plastic film with occludable closure strip portions fused thereto wherein said closure strip portions have profile portions and flange portions, said apparatus comprising feeding means for supplying said closure strip portions; a rotatable, circumferentially grooved lay-on roll adapted to receive the profile portions of said closure strip portions wherein said lay-on roll has circumferential grooves positioned near the opposite ends of said roll and a recessed area between said grooves; a rotatable casting cylinder positioned opposite said lay-on roll wherein the axis of said casting cylinder is parallel to the axis of said lay-on roll; means for advancing said closure strip portions to said lay-on roll; means to control the tension on said closure strip portions as said closure strip portions are fed to said lay-on roll from said feeding means; extruding means for casting a molten plastic film onto said casting cylinder so that said plastic film becomes fused to said flange portions of said closure strip portions; means adapted to control the lamination pressure exerted by said lay-on roll on said casting cylinder when said closure strip portions are fused to said plastic film; and cooling means for the laminated composite of said plastic film and closure strip portions.

2. An apparatus in accordance with claim 1 wherein said cooling means comprises a chill roll.

3. An apparatus in accordance with claim 1 wherein said extruding means comprises a slot die.

4. An apparatus in accordance with claim 3 wherein said slot die has an elongated opening parallel with and spaced from the periphery of said casting cylinder.

5. An apparatus in accordance with claim 1 including means for rotating said casting cylinder at substantially the same surface speed as the speed at which said closure strip portions are advanced.

6. An apparatus in accordance with claim 1 including means to slit and separate edge trim from the laminated composite of said plastic film and closure strip portions.

7. An apparatus in accordance with claim 1 wherein said means adapted to control said lamination pressure comprise jacking bolts.

8. An apparatus in accordance with claim 1 wherein said means adapted to control said lamination pressure comprises at least one air cylinder.

9. An apparatus in accordance with claim 1 wherein said feeding means comprise an unwind stand.

10. An apparatus for producing plastic film with occludable closure strip portions fused thereto wherein said closure strip portions have profile portions and flange portions, said apparatus comprising: feeding means for supplying said closure strip portions; rotatable spaced-apart, circumferentially grooved lay-on rolls; a rotatable casting cylinder positioned opposite said lay-on rolls wherein the axis of said casting cylinder is parallel to the axis of said lay-on rolls; means for advancing said closure strip portions to said lay-on rolls so that unoccluded profile portions of said closure strip portions extend into the grooves of said lay-on rolls; means to control the tension on said closure strip portions as said closure strip portions are fed to said lay-on rolls from said feeding means; extruding means for casting a molten plastic film onto said casting cylinder so that said plastic film becomes fused to said flange portions of said closure strip portions; means adapted to control the lamination pressure exerted by said lay-on rolls on said casting cylinder when said closure strip portions are fused to said plastic film; and cooling means for the laminated composite of said plastic film and closure strip portions.

11. An apparatus in accordance with claim 10 wherein said lay-on rolls comprise a plurality of rubber-covered rolls.

12. An apparatus in accordance with claim 10 wherein said lay-on rolls are only as wide as said closure strip portions.

13. An apparatus in accordance with claim 10 wherein said lay-on rolls are axially movably mounted on a common shaft.

14. An apparatus in accordance with claim 10 wherein said lay-on rolls are mounted on separate shafts.

15. An apparatus in accordance with claim 10 wherein the support of said lay-on rolls is provided with pivot means.

16. An apparatus in accordance with claim 10 wherein said cooling means comprises a chill roll.

17. An apparatus in accordance with claim 10 wherein said extruding means comprises a slot die.

18. An apparatus in accordance with claim 17 wherein said slot die has an elongated opening parallel with and spaced from the periphery of said casting cylinder.

19. An apparatus in accordance with claim 10 including means for rotating said casting cylinder at substantially the same surface speed as the speed at which said closure strip portions are advanced.

20. An apparatus in accordance with claim 10 including means to slit and separate edge trim from the laminated composite of said plastic film and closure strip portions.

21. An apparatus in accordance with claim 10 wherein said means adapted to control said lamination pressure comprise jacking bolts.

22. An apparatus in accordance with claim 10 wherein said means adapted to control said lamination pressure comprises at least one air cylinder.

23. An apparatus in accordance with claim 10 wherein said feeding means comprise an unwind stand.

24. A method for producing plastic film fused to occludable closure strip portions having profile portions and flange portions, said method comprising the steps of advancing said closure strip portions to a rotatable, circumferentially grooved lay-on roll so the unoccluded profile portions of said closure strip portions extend into the grooves of said lay-on roll, said lay-on roll having a recessed area between said grooves, controlling the tension on said closure strip portions as said closure strip portions are fed to said lay-on roll, extruding a molten plastic film onto a rotatable casting cylinder positioned opposite said lay-on roll so that said plastic film fuses to said flange portions of said closure strip portions, controlling the lamination pressure exerted by said lay-on roll on said casting cylinder when said closure strip portions are being fused to said plastic film, and thereafter cooling the laminated composite of said plastic film and closure strip portions.

25. A method in accordance with claim 24 wherein said plastic film is extruded through a slot die having an elongated opening parallel with and spaced from the periphery of said casting cylinder.

26. A method in accordance with claim 24 including slitting and separating edge trim from the laminated composite of said plastic film and closure strip portions.

27. A method in accordance with claim 24 wherein said pressure is controlled with jacking bolts positioned between the supports of said lay-on roll and said casting cylinder.

28. A method in accordance with claim 24 wherein said pressure is controlled with at least one air cylinder connected to the supports of said lay-on roll.

29. A method for producing plastic film fused to occludable closure strip portions having profile portions and flange portions, said method compressing the steps of supplying said closure strip portions, advancing said closure strip portions to rotatable, spaced-apart, circumferentially grooved lay-on rolls so that unoccluded profile portions of said closure strip portions extend into the grooves of said lay-on rolls, controlling the tension on said closure strip portions as said closure strip portions are fed to said lay-on rolls, extruding a molten plastic film onto a rotatable casting cylinder positioned opposite said lay-on rolls so that said plastic film fuses to said flange portions of said closure strip portions, controlling the lamination pressure exerted by said lay-on rolls on said casting cylinder when said closure strip portions are being fused to said plastic film, and thereafter cooling the laminated composite of said plastic film and closure strip portions.

* * * * *